United States Patent [19]

Kiyono

[11] Patent Number: 4,688,948

[45] Date of Patent: Aug. 25, 1987

[54] ELECTRONIC ANALOGUE TIMEPIECE OF DC MAGNETIC FIELD DETECTION TYPE

[75] Inventor: Yoshihiko Kiyono, Tokyo, Japan

[73] Assignee: Seiko Instruments & Electronics Ltd., Tokyo, Japan

[21] Appl. No.: 903,692

[22] Filed: Sep. 4, 1986

[51] Int. Cl.[4] .......................... G04F 5/00; G05B 19/40

[52] U.S. Cl. ...................................... 368/157; 318/696

[58] Field of Search .................... 368/76, 80, 157, 160; 318/696

[56] References Cited

U.S. PATENT DOCUMENTS 4,321,521 3/1982 Ueda et al. ............................ 568/11
4,352,172 9/1982 Ueda et al. ............................ 368/76
4,404,510 9/1983 Nakajima ............................ 368/157
4,460,282 7/1984 Kanno ................................ 368/157
4,533,257 8/1985 Kitano et al. ........................ 368/202

*Primary Examiner*—Vit W. Miska

*Attorney, Agent, or Firm*—Bruce L. Adams; Van C. Wilks

[57] ABSTRACT

In an electronic analogue timepiece driven by a stepping motor, DC magnetic field detector is connected to the stepping motor to detect the presence of an external DC magnetic field by comparing two induced voltages induced across a motor coil due to free rotation of a motor rotor after each application of two successive drive pulses to the motor coil. A controller is connected to the DC magnetic field detector to control the stepping motor to effect compensation for the detected DC magnetic field.

16 Claims, 8 Drawing Figures

ELECTRONIC ANALOGUE TIMEPIECE OF DC MAGNETIC FIELD DETECTION TYPE

BACKGROUND OF THE INVENTION

The present invention relates to an electronic analogue timepiece in which needles or hands indicate time by making use of a battery as an electric power source.

Hitherto, no proposals have been made with respect to electronic analogue timepieces having a function of detecting a d.c. magnetic field. Even if there was an example of such a timepiece, it was necessary to adopt a method of incorporating a mechanical contact element such as a reed switch in the timepiece.

As described above, such a conventional type of electronic timepiece does not have a d.c. magnetic field detection function. There is thus a possibility that an electronic analogue timepiece having a pulse control system may erroneously operate at the time of detection of rotation. Even if, as described above, a reed switch is incorporated in the timepiece, it is difficult to overcome numerous disadvantages such as might by caused by reduction in thickness, layout limitations caused by the increased number of parts and increase in cost.

SUMMARY OF THE INVENTION

It is an object of the present invention to provide an electronic analogue timepiece capable of detecting a d.c. magnetic field without the need to add a mechanical contact element such as a reed switch.

DETAILED DESCRIPTION OF PREFERRED EMBODIMENTS

One preferred embodiment of the present invention will be described below in conjunction with the accompanying drawings.

Figure 1:
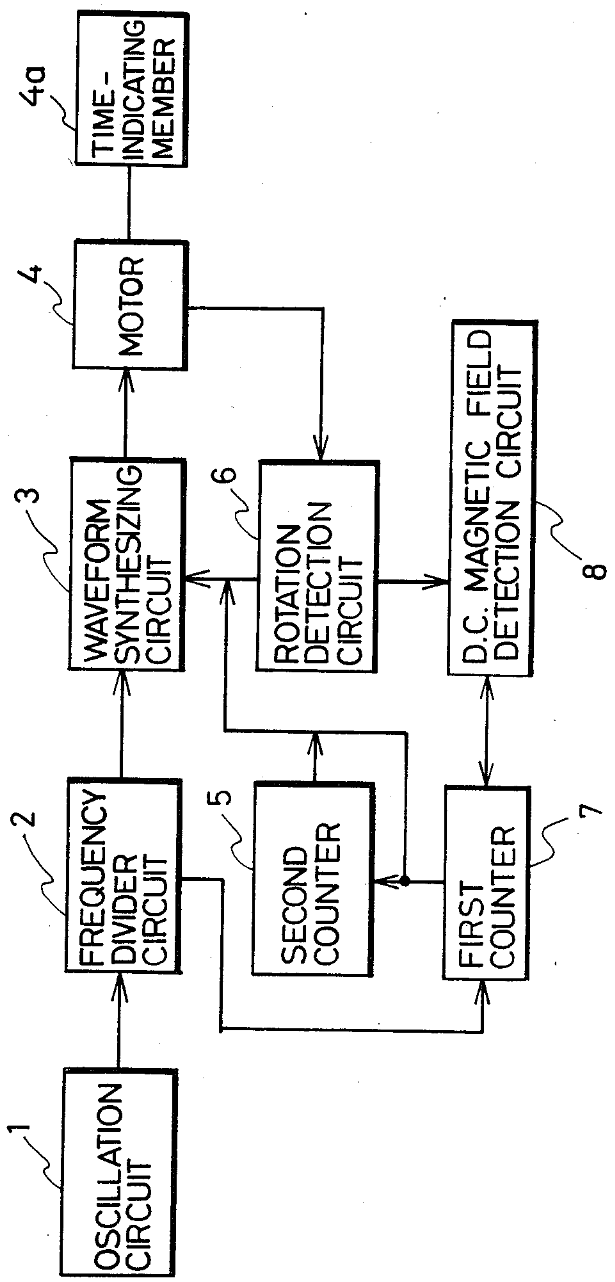
FIG. 1 is a block diagram of a circuit used in a d.c. magnetic field detection type electronic analogue timepiece in accordance with the present invention.

FIG. 1 is a block diagram of the present invention. A pulse control system is comprised of: an oscillation circuit 1 for generating a reference frequency signal; a frequency divider circuit 2 for dividing the frequency signal so as to obtain a required frequency signal; a waveform synthesizing circuit or drive circuit 3 for producing a drive pulse required for the driving of a motor; and a motor 4 for generating a drive torque actually capable of moving a time-indicating member 4*a*, such as needles or hands. Thereafter, judgement is made in a rotation detecting circuit 6 as to whether the motor rotor is rotated or not when the motor 4 is driven. If the result of the judgement is "non-rotation", a corrective drive operation is immediately carried out. The foregoing is the basic operation of the pulse control system.

Figure 3:
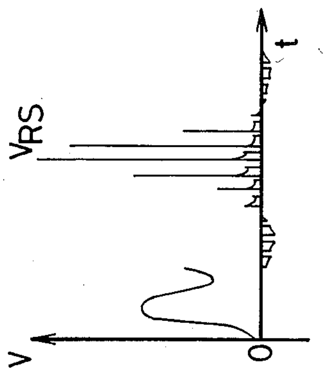
FIG. 3 is a graph showing an example of the waveform of $V_{RS}$.
Figure 2:
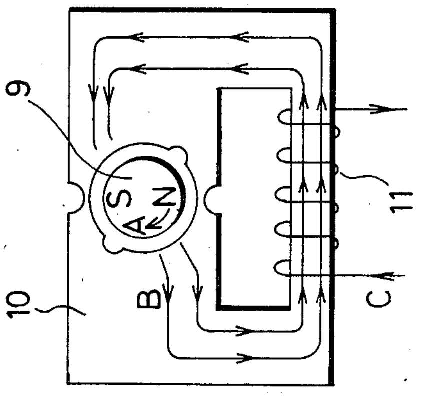
FIG. 2 shows a diagrammatic model of a step motor used for the electronic analogue timepiece of this invention.

In order to make it easier to understand the contents of the present invention, the operational principle of the detection of rotation will be briefly described below. FIG. 2 shows a diagrammatic model of a step motor used in an electronic analogue timepiece. In the Figure, it is assumed that a rotor 9 is in the state of damping oscillation or free rotation after the driving of the rotor 9 has been completed. If the direction of the damping oscillation is assumed as indicated by an arrow A shown in FIG. 2, the direction of an induced magnetic flux which flows in a stator 10 interlinked with or magnetically coupled to a coil 11 is indicated by an arrow B as shown in FIG. 2 and the amount of the induced magnetic flux is increased in function of time. Specifically, since the magnetic flux which is applied to the coil 11 is also increased, a current is generated in the direction of an arrow C. Accordingly, an induced voltage is generated across the coil 11. FIG. 3 shows the relationship between a time t and a voltage V of the waveform obtained by the differentiation of the induced voltage. In this state, measurement is made with respect to the peak value of the differentiated waveform of the induced voltage (hereinafter referred to a "$V_{RS}$"). If the peak value is higher than a certain reference voltage (hereinafter referred to as "$V_{TH}$"), it is judged that the rotor 9 has been rotated, and if the value is lower than $V_{TH}$, it is judged that the rotor 9 has not been rotated. The foregoing is the operational principle of the rotation detection performed by the pulse control system.

Figure 4A:
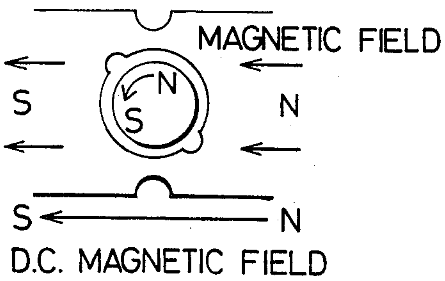
FIG. 4*a* shows the direction of the magnetic field created in a coil.
Figure 4C:
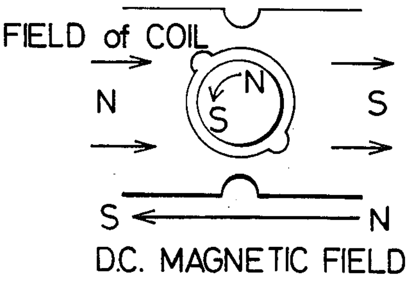
FIG. 4*c* shows the direction of the magnetic field created in a coil.
Figure 4B:
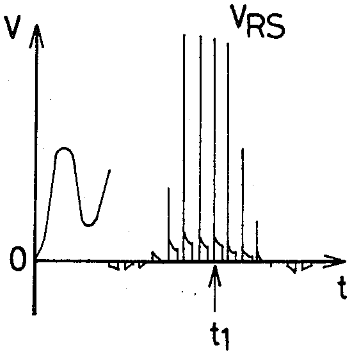
FIG. 4*b* is a graph showing the waveform of a induced voltage.
Figure 4D:
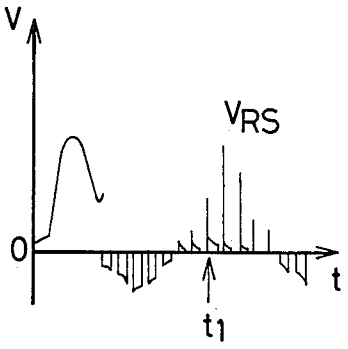
FIG. 4*d* is a graph showing the waveform of a induced voltage.

FIGS. 4*b* and 4*d* show the waveforms of $V_{RS}$ which are produced when the motor is placed in an external d.c. magnetic field. Referring to FIG. 4*a* in which the direction of the excited magnetic field produced by the coil is the same as that of the external d.c. magnetic field, a phenomenon occurs which makes it seem as if there were an increase in the excited magnetic flux which acts on the rotor. In consequence, the rotor driving force is increased and accordingly the angular velocity of damping rotation of the rotor is augmented. This results in an increase in the degree of variation per unit of time in the induced magnetic flux which is created by the damping movement of the rotor and applied to the coil through the stator. This increase is represented by the following equation (1):

$$V = -N(d\phi/dt) \tag{1}$$

where V is the induced voltage, N the number of turns of the coil, $\phi$ is the induced magnetic flux and t is the time.

Hence, the induced voltage is increased, and $V_{RS}$ correspondingly takes high potential along the time axis. This state is shown by FIG. 4*b*. Referring to FIG. 4*c* in which the direction of the excited magnetic flux produced by the coil is opposite to that of the external d.c. magnetic flux, $V_{RS}$ thus generated takes low potential along the time axis and this state is shown in FIG. 4*d*.

Notice should be taken of the fact that a two-pole step motor operates while the states shown in FIGS. 4*a* and 4*c* are alternately repeated. Specifically, when the step motor is placed in an external d.c. magnetic field, the generated $V_{RS}$ alternately takes the states shown in FIGS. 4*b* and 4*d* in response to every step rotation of the rotor. Therefore, if a certain time t is predetermined and two peak values of $V_{RS}$ generated at the time t during successive step rotations of the rotor are continuously measured, judgement can be made as to whether or not the step motor is placed in the external d.c. magnetic flux.

Figure 5:
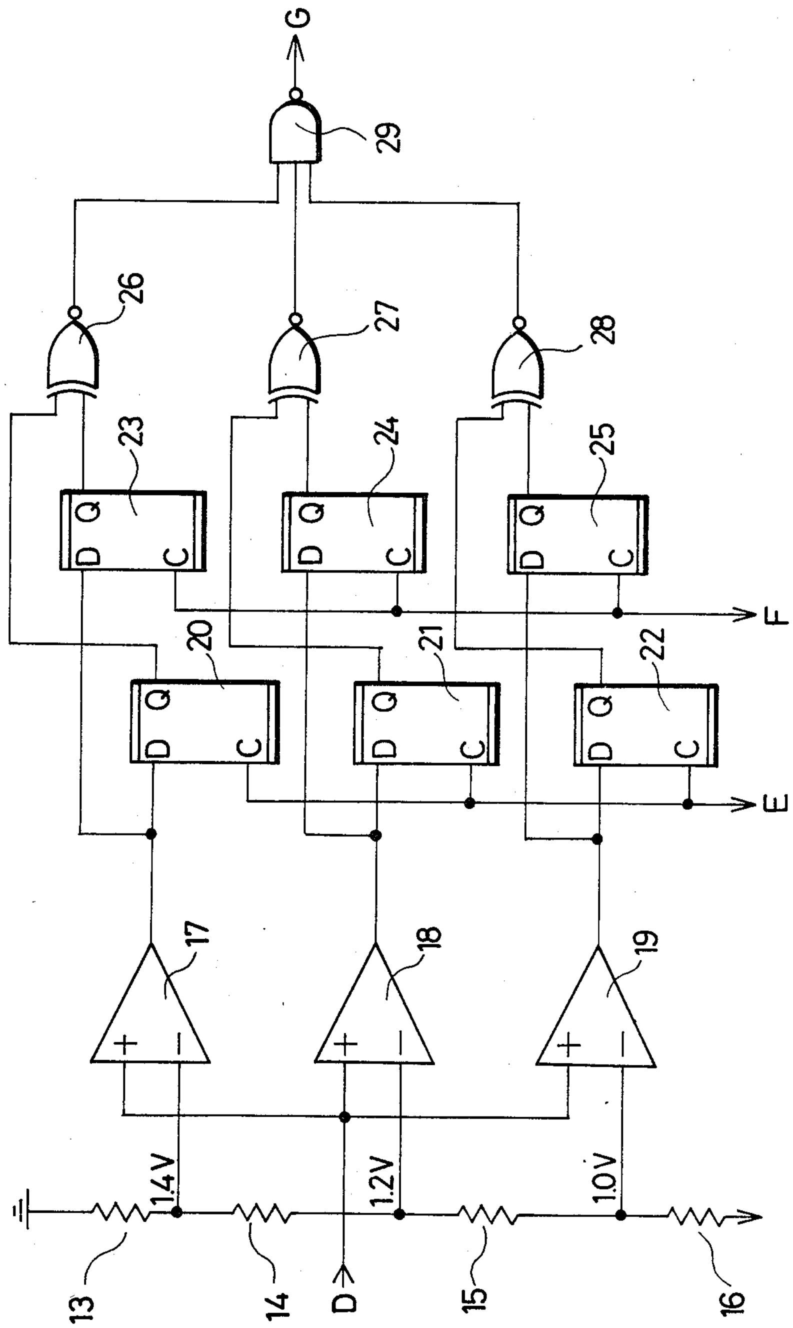
FIG. 5 is a logic diagram of one preferred embodiment of the d.c. magnetic field detecting circuit of this invention.

FIG. 5 shows one preferred embodiment of a d.c. magnetic field detection circuit in accordance with the present invention. The operation of detecting a d.c. magnetic field will be described below in detail with reference to the accompanying drawings.

In FIG. 5, reference numerals 13 to 16 denote voltage dividing resistors for generating reference voltages, respectively. It is assumed that three comparators 17 to 19 are provided as shown and $V_{TH}$ at each comparator is set to 1.4 V, 1.2 V and 1.0 V respectively. The motor is driven one step and the respective output levels of the comparators 17 to 19 are determined on the basis of the value of $V_{RS}$ (hereinafter referred to as "$V_{RS1}$") generated thereby. As an example, if $V_{RS1}=1.9$ V, each comparator output takes a high level (hereinafter referred to as "H"). In this state, a clock signal is supplied through the input E and the output level is held by half latches 20 to 22, respectively. After the passage of the time interval required for needle drive, the motor is driven another step, and $V_{RS}$ (hereinafter referred to as "$V_{RS2}$") generated thereby is applied to the comparator in the same manner as described above. If it is assumed that $V_{RS2}=1.3$ V, the outputs of the comparators 18 and 19 take "H" in the same manner as described above, but the output of the remaining comparator 17 takes a low level (hereinafter referred to as "L "). In this state, a clock signal is supplied through an input F, and the output level is held by half latches 23 to 25 in the same manner as described above. The contents of the half latches 20 to 22 and 23 to 25 are input to exclusive NOR gates 26 to 28 (hereinafter referred to as "EX-NOR"), respectively. Since the output of each EX-NOR takes "H" when the two inputs take the same level, the outputs of the EX-NORs 27 and 28 take "H". However, the output of the EX-NOR 26 takes "L" since the Q output of the half latch 20 takes "H" and the Q output of the half latch 23 takes "L". When the three EX-NOR outputs are input to a NAND gate 29 (hereinafter referred to as "NAND"), since the output of the EX-NOR 26 takes "L", the output of the NAND 29 takes "H". Specifically, when the level of $V_{TH}$ of at least one of the comparators 17 to 19 is placed between the levels of $V_{RS1}$ and $V_{RS2}$, that is, when $V_{RS1}$ and $V_{RS2}$ show values different from each other, the output of the NAND 29 takes "H". When $V_{RS1}$ and $V_{RS2}$ show the same values, each output of the EX-NOR 26 to 28 takes "H", so that the output of the NAND 29 is maintained at the "L" level. In other words, an output G is produced as a d.c. magnetic field detection signal representative of existence of an external d.c. magnetic field. The foregoing is the principle of detecting a d.c. magnetic field.

Finally, turning again to FIG. 1, the actual operation of the timepiece of this invention will be described below.

As described previously, the pulse control system is driven by means of the oscillation circuit 1, the frequency divider circuit 2, the waveform synthesizing circuit 3, the motor 4 and the rotation detection circuit 6. Reference is made to the use of a first counter 7, a second counter 5 and a d.c. magnetic field detection circuit 8 as an example of d.c. magnetic field detection. In order to detect a d.c. magnetic field, the signal of the rotation detection circuit 6 is used as described above. The first counter 7 serves as a counter for determining the period of d.c. magnetic field detection, and is operated in response to the signal of the frequency divider circuit 2. The d.c. magnetic field detection circuit 8 monitors the presence or the absence of a d.c. magnetic field each time the first counter 7 overflows. If the circuit 8 judges that the magnetic field is present, the operation of the waveform synthesizing circuit 3 is stopped or suspended, and accordingly, the motor 4 is stopped, and the passage of real time is counted by the first counter 7. When the circuit 8 again carries out the detection of a d.c. magnetic field in response to the overflow carry of the first counter 7 and judges that the d.c. magnetic field remains, the first counter 7 continues to count up, and simultaneously, the second counter 5 is caused to count up step by step. This operation is continued, and, if the d.c. magnetic field detection circuit 8 judges that a d.c. magnetic field is absent, the quick driving operation to compensate for the time measured by the first and second counters is carried out at high speed in order that the time indicated by the needles may correspond to real time. It is well known that common electronic analogue timepieces adopt the twelve-hour system. Therefore, if the second counter 5 is set to operate as a twelve-hour measurement counter, even when a timepiece is placed in such d.c. magnetic field as might continue to act thereon for twelve hours or more, there is no risk of causing errors in real measurement. Accordingly, it is possible to improve the reliability of timepieces.

As described above, in accordance with the present invention, a d.c. magnetic field detection function is incorporated in an electronic analogue timepiece using a pulse control system, so that it is possible to eliminate not only erroneous detection in a d.c. magnetic field, but also correct a real-time delay derived from an erroneous action. Unlike a conventional d.c. magnetic field detection type electronic analogue timepiece using a mechanical contact element such as a reed switch, the entire d.c magnetic field detection circuit of this invention can be constructed within one chip of C-MOS-LSI without using mechanical parts, whereby the present invention can achieve remarkable advantage such as an easily accomplished reduction in the thickness and the size of a timepiece, a considerable allowance of layout, and a reduction in cost due to the elimination of mechanical parts.

I claim:

1. A d.c. magnetic field detection type electronic analogue timepiece comprising:

a step motor having a rotor, a stator and a coil, said rotor being driven to undergo step rotation by application of driving pulses to said coil;

waveform synthesizing means for generating said driving pulses and applying said driving pulses to said step motor;

d.c. magnetic field detecting means operative during at least two successive step rotations of the rotor for detecting a voltage induced in said coil due to each damping oscillation of said rotor after the application of said successive driving pulses to produce an output signal representative of the existence of an external d.c. magnetic field; and control means responsive to the output signal of said d.c. magnetic field detecting means for controlling the waveform synthesizing means to compensate for the detected d.c. magnetic field.

2. A d.c. magnetic field detection type electronic analogue timepiece as claimed in claim 1; wherein said d.c. magnetic field detecting means includes means for generating an output signal when the difference between two induced voltages detected during two successive step rotations of the rotor is greater than a predetermined value.

3. A d.c. magnetic field detection type electronic analogue timepiece as claimed in claim 1; wherein said control means includes stopping means for stopping the application of the driving pulses generated by said waveform synthesizing means in response to said output signal from the d.c. magnetic field detecting means.

4. A d.c. magnetic field detection type electronic analogue timepiece as claimed in claim 3; wherein said control means further includes restarting means for restarting said waveform synthesizing means to apply to the step motor quick driving pulses corresponding to the interval during which the application of the driving pulses was stopped.

5. A d.c. magnetic field detection type electronic analogue timepiece as claimed in claim 1; wherein said control means includes first counter means for generating a trigger pulse to control the d.c. magnetic field detecting means to carry out the detecting operation at predetermined intervals of time, and second counter means connected to the first counter means for counting consecutive intervals of time to control said waveform synthesizing means.

6. A d.c. magnetic field detection type electronic analogue timepiece as claimed in claim 5; wherein said first counter means applies an overflow carry signal to said signal counter means as a counting pulse.

7. A d.c. magnetic field detection type electronic analogue timepiece as claimed in claim 5; wherein said first counter means applies an overflow carry signal to said d.c. magnetic field detecting means as said trigger pulse.

8. A d.c. magnetic field detection type electronic analogue timepiece as claimed in claim 5; wherein said second counter means comprises a twelve-hour measurement type counter.

9. A d.c. magnetic field detection type electronic analogue timpiece as claimed in claim 5; wherein said second counter means comprises a twenty-four hour measurement type counter.

10. An electronic analogue timepiece comprising: a stepping motor operative to be driven stepwise to control the movement of a time-indicating member, the stepping motor having a coil, a stator magnetically coupled to and excited by the coil to produce drive torque, and a rotor rotatably disposed in an opening in the stator and responsive to the drive torque to undergo step rotation; driving means for applying drive pulses to the coil to effect step rotation of the rotor; detecting means for detecting a voltage induced across the coil due to free rotation of the rotor relative to the stator after the application of the drive pulses to the coil to analyze the detected voltage to thereby produce an output signal representative of the existence of an external DC magnetic field; and controlling means responsive to the output signal from the detecting means for controlling the driving means to effect compensation thereof for the detected DC magnetic field.

11. An electronic analogue timepiece as claimed in claim 10; wherein the detecting means includes means for detecting two induced voltages after each application of two successive drive pulses.

12. An electronic analogue timepiece as claimed in claim 11; wherein the detecting means includes means for compensating the two induced voltages with each other.

13. An electronic analogue timepiece as claimed in claim 12; wherein the detecting means includes means for producing an output signal when the difference between the two induced voltages exceeds a predetermined value.

14. An electronic analogue timepiece as claimed in claim 10; wherein the controlling means includes means for suspending the application of the drive pulses when the DC magnetic field is detected to thereby suspend the movement of the time-indicating member.

15. An electronic analogue timepiece as claimed in claim 14; wherein the controlling means includes correcting means for correcting the position of the time-indicating member after release of the suspension of the application of the drive pulses.

16. An electronic analogue timepiece as claimed in claim 15; wherein the correcting means includes means for effecting the application of quick drive pulses to the coil to thereby effect quick movement of the time-indicating member.

* * * * *